(12) United States Patent
Johnson

(10) Patent No.: US 6,859,886 B1
(45) Date of Patent: Feb. 22, 2005

(54) IO BASED EMBEDDED PROCESSOR CLOCK SPEED CONTROL

(75) Inventor: Stephen B. Johnson, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 477 days.

(21) Appl. No.: 09/969,377

(22) Filed: Oct. 2, 2001

(51) Int. Cl.⁷ .............................................. G06F 1/32
(52) U.S. Cl. ...................... 713/600; 713/500; 713/501; 713/320; 713/322; 712/43; 327/540; 327/544
(58) Field of Search ................................ 713/320, 322, 713/500, 501, 600; 712/43; 327/540, 544

(56) References Cited

U.S. PATENT DOCUMENTS

| | | | |
|---|---|---|---|
| 5,502,838 A | | 3/1996 | Kikinis |
| 5,557,578 A | * | 9/1996 | Kelly ........................ 365/222 |
| 5,590,061 A | | 12/1996 | Hollowell, II et al. |
| 5,675,282 A | * | 10/1997 | Saito ........................ 327/544 |
| 5,719,800 A | | 2/1998 | Mittal et al. |
| 5,723,998 A | | 3/1998 | Saito et al. |
| 5,745,375 A | | 4/1998 | Reinhardt et al. |
| 5,752,011 A | | 5/1998 | Thomas et al. |
| 5,825,674 A | | 10/1998 | Jackson |
| 5,832,284 A | | 11/1998 | Michail et al. |
| 5,870,614 A | | 2/1999 | Ang |
| 5,881,298 A | | 3/1999 | Cathey |
| 5,940,786 A | | 8/1999 | Steeby |
| 6,336,080 B1 | | 1/2002 | Atkinson |
| 6,415,388 B1 | | 7/2002 | Browning et al. |
| 6,519,706 B1 | * | 2/2003 | Ogoro ........................ 713/322 |
| 6,535,798 B1 | | 3/2003 | Bhatia et al. |
| 6,535,984 B1 | | 3/2003 | Hurd |
| 6,564,328 B1 | | 5/2003 | Grochowski et al. |
| 6,694,441 B1 | * | 2/2004 | Sethia ........................ 713/322 |
| 6,715,089 B2 | * | 3/2004 | Zdravkovic ................. 713/322 |
| 6,718,474 B1 | | 4/2004 | Somers et al. |
| 6,751,741 B1 | | 6/2004 | Kawahara et al. |

FOREIGN PATENT DOCUMENTS

WO    WO 92/10032    6/1992

* cited by examiner

*Primary Examiner*—Rehana Perveen
(74) *Attorney, Agent, or Firm*—Yee & Associates, P.C.

(57) ABSTRACT

An input/output controller that allows independent and configurable reduction of clock speeds to its embedded processors when they are not in use to save average power consumption. The processor clock speeds are restored when new input/output requests are received.

21 Claims, 3 Drawing Sheets

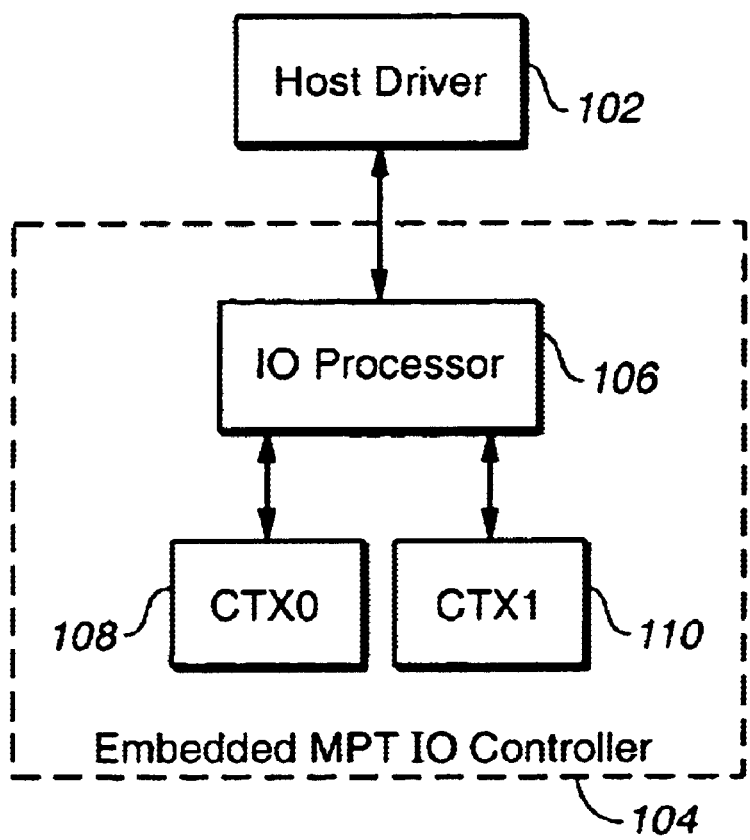
FIG._1

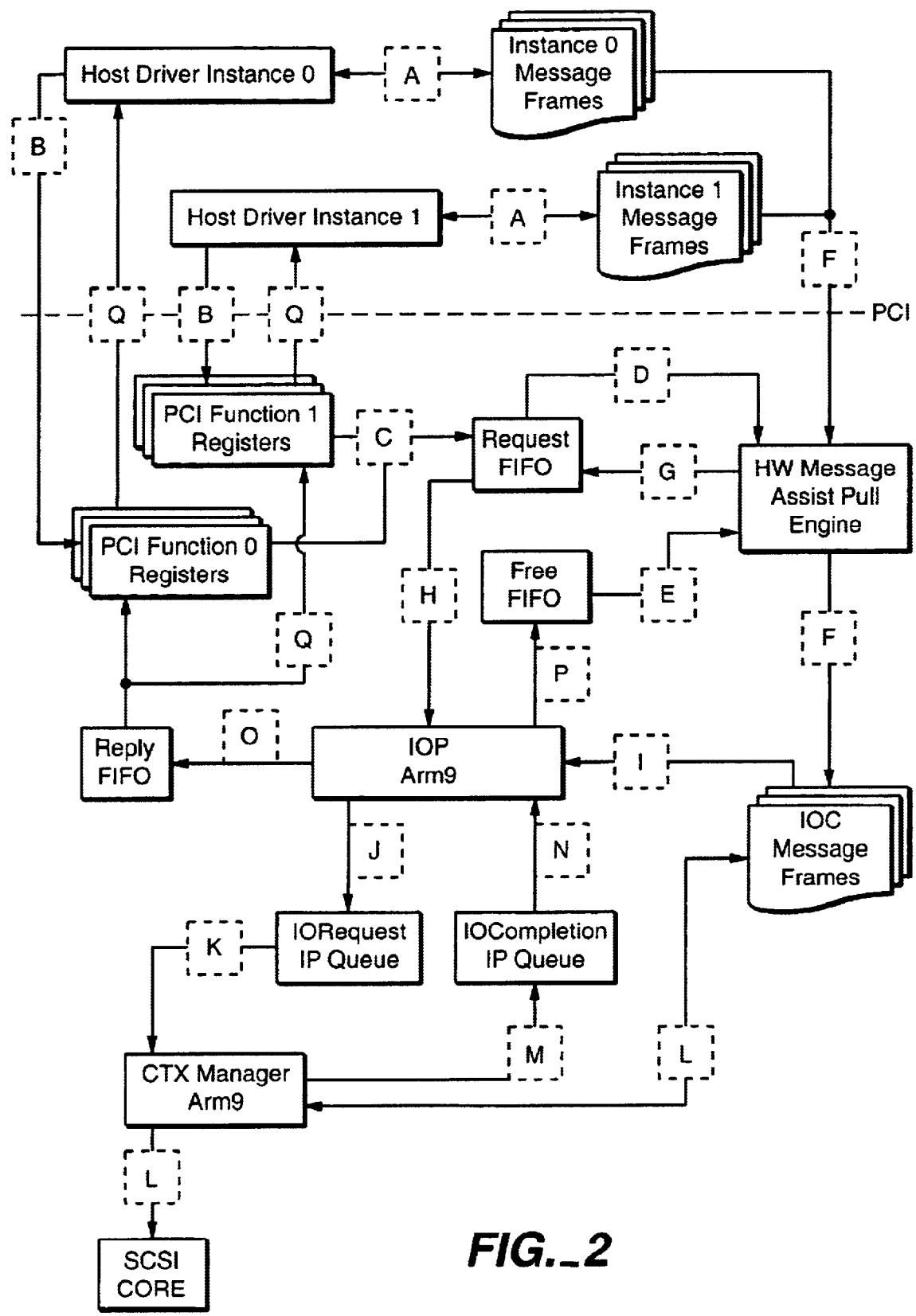
FIG._2

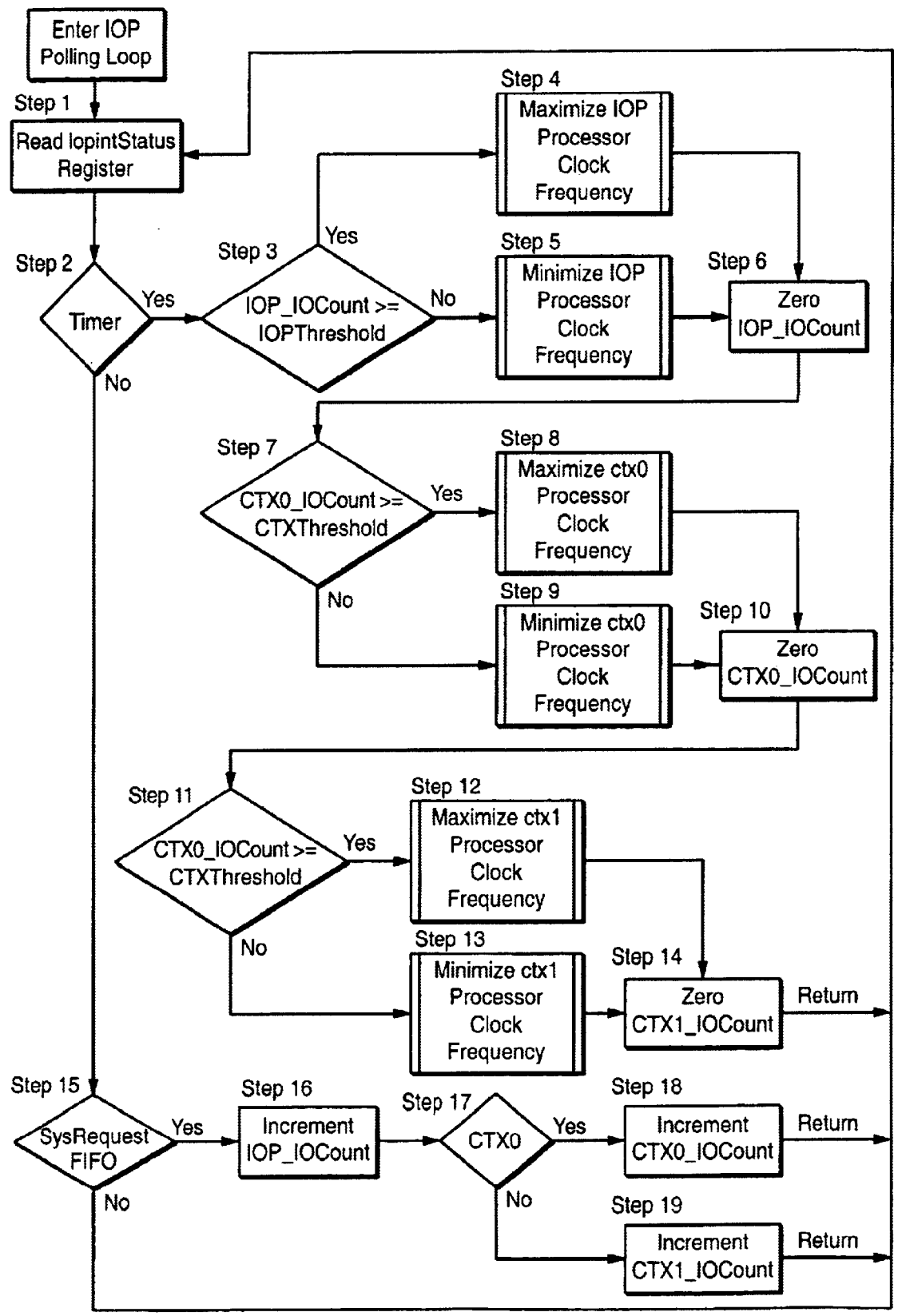
FIG._3

IO BASED EMBEDDED PROCESSOR CLOCK SPEED CONTROL

BACKGROUND OF THE INVENTION

1. Technical Field

The present invention is directed generally toward data processing computer systems, and more particularly, to transfer of data to and from a host system and one or more input/output devices with an input/output controller.

2. Description of the Related Art

The use of the microprocessor and its bus architecture in a computer system are well known. Peripheral devices are coupled to a bus and can provide various functions related to the computer system.

Typical computer systems comprise can be broken down into three main subsystems: main memory, one or more host processors or CPUs, and an input/output (I/O) subsystem. In order to provide communication between the host processor and a plurality of external input/output (I/O) devices, it is effective for data processing systems to utilize an intermediate control unit, also known as an I/O controller.

The I/O controller facilitates interchange of data between a computer system and remote peripheral devices. As a result, I/O controllers relieve the main host processor of many of its operating cycle obligations for ensuring that data exchanges between various remote peripheral devices and the main host processor system is accomplished with minimal interruption to the main host processor.

In most conventional systems utilizing such an approach, the host processor supplies an appropriate command to the I/O controller. The I/O controller then interprets the commands so that the selected I/O device can be identified and the appropriate data processing and transfer operations can occur. The host normally supplies such commands in sequence and the I/O processor processes such commands in such sequence. If the I/O processor is busy with a particular command requiring the servicing of a specified I/O device, then the host must wait until that process is complete before it can issue subsequent commands related to either the same or a different I/O device.

Within many kinds of IO controllers, multiple different processors are often employed. When the controller receives an input/output request, one of the processors routes the request to lower level processors, or context managers, that complete the input/output request. Depending on the task the host system is accomplishing, the input/output rate can vary greatly. At times when input/output request rate is high, all processors of the controller are in use. When input/output request rates are low, some or all of the processors of the controller may not be in use at all times. However, typical systems require that unused I/O processors sit idle waiting for new I/O requests to process, consuming substantially the same average power as if they were in use. It would be advantageous to provide a controller wherein average power consumption is decreased when the processors are not needed.

SUMMARY OF THE INVENTION

The present application shows a way to decrease power consumption of input/output controllers. In a preferred embodiment and by way of example, an IO controller which processes IO requests from a host monitors the number of IO requests being processed and reduces the clock speeds of embedded processors during idle times to save power. Preferred embodiments which include an IO processor (IOP) and other embedded processors can monitor which processors are processing which requests, and decrease or increase individual processors' clock speeds accordingly. In some embodiments, the IOP can also decrease or increase its own clock frequency based on the IO rate. In other embodiments, the speeds of external and internal busses are increased a or decreased as well according to the IO rate. Clock speeds that have been decreased are increased as soon as the IOP receives a new IO request, ensuring that all IOs are processed at the fastest rates possible. By lowering clock frequencies when processors are not processing IO requests, power consumption is decreased without compromising processing speed.

Alternative embodiments allow reduction of bus and memory clock speeds as well, preferably when the controller has not received new input/output requests in a substantial configurable period of time.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a block diagram showing the relationship between the host system and the controller.

FIG. 2 shows how a message sent from the host passes through the controller and how the controller completes the IO request and replies back to the host.

FIG. 3 shows the IOP polling loop and demonstrates an example of how the IOP can selectively reduce clock frequencies.

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, the relationship between host driver 102 and the embedded IO controller 104 is shown. In this figure the host driver 102 is part of a host system which could be the host operating system on a server for example, or any external entity outside of the embedded controller. The host driver communicates with the embedded IO controller 104 through an interconnect, preferably a PCI. The embedded IO controller includes an input/output processor 106, or IOP, along with a number of context managers 108, 110, referred to herein as CTX0, CTX1, etc. In this example and others, only two context managers are depicted, though of course more could be employed.

In a preferred embodiment, the IO processor receives IO requests from the host operating system via a message based interface (e.g., MPT) and routes the IO request to the appropriate lower level processor, which in this example includes the context manager processors CTXO and CTX1. The lower level processors complete the IO request consistent with the port protocol associated with that channel, e.g., SCSI, Fibre Channel, or Serial ATA.

The IOP has a timer which interrupts the IOP at regular and configurable intervals. In a preferred embodiment, the interrupt time is one second, though the time is variable from a few microseconds to a few days. At the interrupt time, the IOP can check the number of outstanding IO requests that the IO controller is currently processing and exactly what processors are busy processing them.

Based on this information, the IOP can determine if any of the embedded processors' clock speeds can be reduced to save power. The IOP can also determine if it should reduce its own clock speed. Thus, as the IO controller processes IO requests from the host operating system, it uses this information to increase or decrease clock speeds of its various constituent (preferably embedded) processors effectively based on the IO rate. If few or no IO requests are being processed and one or more embedded processors are not being used, the respective clock speeds of channels associated with unused processors can be selectively reduced, saving average power consumption. In a preferred embodiment, the IOP compares the count of currently processing requests in each processor to a predetermined configurable threshold. The threshold is preferably one, so that the clock speed of a given channel is reduced only if there are no pending requests associated with that channel. This is discussed further below.

In a preferred embodiment, the IO processor has a set interval at which a timer interrupts it. The interval is configurable. At these interrupt times, the IOP checks the number of outstanding IO requests that are being currently processed by itself and by other individual constituent processors of the IO controller. Each time the IOP receives a message request from the host driver it increments a counter that represents the number of outstanding IO requests. Each time the IOP replies back to the host after processing the request, it decrements the counter. Likewise, while incrementing the IOP counter itself, the IOP also determines by which context manager the IO request is being processed, and increments a counter related to the particular context manager. For example, if the IO request is processed by CTXO, then a counter associated with CTX0 (referred to herein as CTX0_IO Count) is incremented by one. If the IO request is processed by another context manager, then another counter related to that context manager is incremented, such that the IOP at any interrupt interval may read its own counter and the counters of the embedded processors to determine exactly how many pending IO requests are being processed, and by which processors they are being processed.

Of course, the order in which these actions are described can vary between embodiments without straying from the present inventive concepts.

By the above described process, during any given timer interrupt of the IOP, the IOP can check counters to determine how many outstanding IO requests there are and which embedded processors are busy processing them. This information also of course tells the IOP if there are any embedded processors which are not busy. In a preferred embodiment, if the IOP count itself (which represents the total number of IO requests that the IO controller is processing) is zero, then no IO requests are currently being processed by the IO controller and the IOP reduces the clock speeds on all the IO controller embedded processors. The clock speeds are increased again as soon as the IOP receives a new IO request, ensuring that all IO requests are processed as quickly as possible.

Similarly, if the outstanding IO request count is zero on one channel and not another, then the IOP can reduce the clock speed associated with the processor on the channel with the zero outstanding IO request count. This allows the IOP to reduce clock speeds on unused charnels while maintaining high clock frequencies on channels busy processing IO requests.

FIG. 2 shows how a message sent from the OS driver passes through the controller and how the controller completes the IO request and replies back to the host.

In this figure, the host and the IOC communicate through a PCI (Peripheral Component Interconnect), a circuit board bus connection that connects boards to memory and the CPU. The dashed line demarks the boundary between host and IOC. In a preferred embodiment, the IOC comprises the IOP and other embedded processors, referred to as context managers. The relationships between the depicted block segments are discussed with reference to the boxed letters throughout the drawing.

First, the host operating system creates a SCSI (Small Computer System Interface) IO message in the host address space (steps A). The host posts the System Message Frame Address (SMFA), the addresses of frames which the host OS driver controls, to a PCI Function Request register, part of the hardware embedded on the IO controller chip (step B). The hardware routes the PCI Function Request register to a Request FIFO (step C) which passes the SMFA to a hardware Message Assist Engine (step D). The Message Assist Engine waits for a free Local Message Frame Address (LMFA) (step E) and then passes the System Message Frame to a Local Message Frame (step F) via direct memory access (DMA).

Next, the Message Assist Engine writes the LMFA to the Request FIFO (step G). The IOP polls the interrupt status register (not shown) for a new request and gets the LMFA (step H). The IOP examines the message header function to determine the message type (step 1). Next, the IOP posts the message index descriptor (MID), an index to message frames, on the interprocessor (IP) IO Request Queue (step J). A context manager (CTX Manager), otherwise referred to as a bus protocol manager, polls the interrupt status register for the message index (MID) to find new IO requests (step K). The context manager puts the MID into a context lookup table and copies the message to the SCSI core IO Bucket (step L). The context manager completes the IO by posting the unmodified MID on the IO Completion IP Queue (step M). The IOP polls the interrupt status register and gets the MID (step N). On success, the IOP posts the unmodified MID to the reply FIFO using the function bit in the MID to determine which function to reply to (step O). The IOP then frees the LMFA (step P) and the host gets an interrupt for the reply (step Q).

FIG. 3 shows the IOP polling loop and demonstrates an example of how the IOP can select embedded processors and other elements (e.g., busses, memory) for reduction of clock frequency. When the IOP enters the polling loop, it first reads the IOP interrupt status register which shows how many IO requests are currently being processed by the IOC's various embedded processors (step 301). In this example, the IOC comprises the IOP and two context managers, CTX0 and CTX 1, which are sequentially checked for use.

The IOP has a timer that interrupts the IOP at regular configurable intervals. In a preferred embodiment, the interrupts are configured to occur at one second intervals. When the timer interval interrupts the IOP (step 302), the IOP checks the number of outstanding IOs that the IO controller is currently processing and exactly what processors are busy processing them. In a preferred embodiment, depicted in this figure, the IOP checks the number of outstanding IOs in a sequential fashion as discussed further below.

First, the IOP checks the IOP_IO Count (the number of outstanding IO requests within the controller itself) (step 303) to see if it is equal to or greater than a predetermined configurable threshold. In the preferred embodiment, the threshold is one. If the count is equal to or greater than the threshold, the IOP maximizes the IOP clock frequency (step 304) by reading and writing to the register that controls the processor clock frequency. If the IOP_IO count does not exceed the predetermined threshold (i.e., no requests are pending in any of the embedded processors), then the IOP processor clock frequency is reduced or minimized under the circumstances (step 305). After the IOP has maximized or minimized its clock (depending on the IOP_IO Count), it sets the IOP_IO Count to zero (step 306).

Next, the IOP checks the number of outstanding IO requests being processed by the first context manager (one of the embedded processors of the IO controller), CTXO, by counting CTX0_IO Count (the number of outstanding IO requests at CTXO) (step 7). If the number is equal to or greater than a predetermined threshold (which may or may not necessarily be the same as the IOP_IO Count threshold, but is one in a preferred embodiment), then the CTXO processor clock frequency is maximized (step 8). If the CTX0_IO Count is below the threshold, then the IOP minimizes the CTXO processor clock frequency (step 9). After the interrupt and the IOP has maximized or minimized the first context manager's clock frequency, the CTX0_IO Count is set to zero (step 10).

The IOP then checks the number of outstanding IO requests pending in the second context manager (another embedded processor of the IO controller) CTX1, by checking the CTX1_IO Count (step 11). If the number of outstanding requests being processes by CTX1 is equal to or greater than the threshold, then the IOP changes the CTX1 processor clock to maximum frequency (step 12). If the CTX1_IO Count is below the threshold, then the IOP A minimizes the CTX1 processor clock frequency (step 13). After the IOP has altered the CTX1 processor clock frequency, then the IOP resets the CTX1_IO Count to zero (step 14).

If the host system sends another IO request (step 15) then the IOP_IO Count is incremented (step 16) indicating that the IOC has another IO request pending in its embedded processors. If the IO request is processed by the CTXO embedded processor (step 17) then the CTX0_IO Count is incremented by one (step 18) to indicate which context manager is processing the request. If the request is instead being processed by the other embedded processor, CTX1, then the CTX1_IO Count is incremented by one (step 19).

Though the preferred embodiments described herein refer to embedded lower level processors (context managers), the innovative concepts can also be applied to a controller that does not rely on embedded processors. Though this might require slightly different implementation, the innovation of reducing individual processors of the IO controller based on the IO rate is within the contemplation of the present application.

In addition to slowing the clock rates of the processors of the controller, the clock speeds of internal busses, embedded chip memory, and external memory can be reduced or increased. This is preferably reserved for when the controller has not received any new input/output requests for several interrupt intervals in a row and no input/output requests are pending. Thus the disclosed innovations show reducing and increasing the various clock speeds of the embedded processors individually, or in groups, according to the input/output request rate, as well as reducing and increasing other controller functions such as busses and memory according to the input/output rate.

The innovations described herein allow efficient power use by the host and by the controller. The new controller can reduce average power consumption by reducing unused individual processor clocks or by reducing all processor clocks, depending on the usage. The system or method also monitors the processors' usage at configurable intervals, such that the controller has the potential to reduce power consumption nearly on demand. The innovations also allow the processor clocks to be changed very frequently, which allows average power conservation in an environment where controller processor usage varies greatly over time. The implementation of this power savings is also advantageously invisible to the host driver or operating system, since the changes can all be implemented internally to the controller itself., Thus no alterations need be made to the host in order to implement the innovative controller.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

What is claimed is:

1. An input/output (I/O) controller, comprising:
    an I/O processor configured to receive I/O requests from a host driver;
    a plurality of context managers connected to received the I/O requests from said I/O processor, wherein each of said plurality of context managers are connected to complete the I/O requests consistent with a given protocol;
    wherein said I/O processor is connected to periodically determine a number of outstanding I/O requests being processed by each of said plurality of context managers and if said number of outstanding I/O requests of at least one of said context managers is less than a threshold value, to reduce a clock speed of said at least one of said plurality of context managers;
    wherein if no I/O requests are being currently processed by said I/O controller and no I/O requests have been received for a configurable interval, an associated clock speed can decreased by a configurable interval for any device from the from of an internal bus, an embedded chip memory and an external memory.

2. The I/O controller of claim 1, wherein the input/output processor is interrupted at configurable intervals.

3. The I/O controller of claim 1, wherein said input/output processor further counts a number of outstanding input/output requests being processed by said controller.

4. A computer system, comprising:
an input/output (I/O) controller containing an input/output processor and a plurality of context managers, each of said context managers being connected to receive I/O requests through said I/O processor and to complete said I/O requests consistent with a given protocol, said input/output controller being configured to provide a first count of current input/output requests being processed by said input/output controller and a plurality of second counts of input/output requests being processed by respective ones of said plurality of context managers; and
a host processor connected to sand input/output requests to said input/output controller;
wherein a clock speed of at least one of said plurality of context managers is adjusted depending on a respecting one of said plurality of second counts;
wherein if said controller has riot received a new input/output within a predetermined period of time and said first count equals zero, then a clock speed associated with at least one of the following is reduced: (a) an internal bus, (b) an embedded chin memory, and (c) an external memory.

5. The computer system of claim 4, wherein if said first count equals zero, then the respective clock speeds of said input/output processor and said plurality of context managers are reduced.

6. The computer system of claim 4, wherein if one of said second counts equals zero, the clock speed of a corresponding one of said context managers is reduced.

7. The computer system of claim 6, wherein the clock speed of said corresponding one of said context managers is restored to an original value when new input/output requests are received by it.

8. The computer system of claim 4, wherein each of input/output processor and said plurality of context managers are embedded processors.

9. A computer system, comprising:
a host driver which sends input/output requests;
an input/output controller which controls the input/output requests, the controller having a plurality of embedded processors, each of the plurality of embedded processors having an associated clock speed;
wherein a first of the plurality of embedded processors is an input/output processor which counts the total number of outstanding input/output requests and a number of outstanding input/output requests being processed by each of the plurality of embedded processors;
wherein if there are no outstanding input/output requests being processed by a second embedded processor of the plurality, a clock speed associated with the second embedded processor is reduced; and
wherein if there are no outstanding input/output requests being processed by any of the plurality of embedded processors, clock speeds of all of the plurality of embedded processors are reduced;
wherein if the controller has not received a new input/output request within a predetermined period of time and no requests are pending, then a clock speed associated with at least one of the following is reduced: (a) an embedded chip memory and (b) an internal bus.

10. The computer system of claim 9, wherein if the clock speeds of all the embedded processors have been reduced, a clock speed of at least one embedded processor is increased when a new input/output request is received by the controller.

11. The computer system of claim 9, wherein if the clock speed associated with the second embedded processor has been reduced, the clock speed of the second embedded processor is increased when a new input/output request is directed to the second embedded processor.

12. A computer system, comprising:
a host which sends requests to an input/output controller, said input/output controller comprising a plurality of processors;
counting means for counting a number of input/output requests currently being processed by the plurality of processors;
counting means for adjusting the clock speed of at least one of the plurality of processors;
wherein if a first processor of the plurality is not currently processing an input/output request, the clock speed associated with that processor is reduced; and
wherein if the clock speed associated with the first processor has been reduced and the first processor receives a new input/output request, the clock speed associated with the first processor is increased;
wherein if the controller has not received a new input/output request within a predetermined period of time and no requests are pending, then a clock speed associated with at least one of the following is reduced: (a) an embedded chin memory, (b) an internal bus, and (c) an external memory.

13. The computer system of claim 12, wherein the plurality of processors are embedded processors.

14. The computer system of claim 12, wherein if the controller is not currently processing any input/output requests, the clock speeds associated with all the plurality of processors are reduced.

15. A computer program product, comprising:
first instructions for interrupting an input/output processor at a configurable interval;
second instructions for counting a number of input/output requests being currently processed by a controller;
third instructions for comparing the number of outstanding input/output requests being currently processed by the controller to a predetermined threshold; and
fourth instructions for reducing a processor clock speed associated with the controller if the number of outstanding input/output requests is less than the threshold;
fifth instructions for reducing a clock speed if the controller has not received a new input/output request within a predetermined period of time and no requests are pending, said clock speed being associated with at least one of the following: (a) an embedded chin memory, (b) an internal bus, and (c) an external memory.

16. The product of claim 15, wherein the input/output processor is an embedded processor.

17. The product of claim 16, further comprising a plurality of embedded context managers, wherein a clock speed associated with each individual embedded context manger is capable of being independently reduced when a context manager has no outstanding input/output requests.

18. A method of controlling input/output requests, comprising the steps of:

interrupting, in an input/output controller, an input/output processor at a configurable interval;

counting a number of outstanding input/output requests being currently processed by the controller;

comparing the number of outstanding input/output requests being currently processed by the controller to a predetermined threshold;

reducing a processor clock speed associated with the controller if the number of outstanding input/output requests is less than the threshold; and if the controller has not received a new input/output request within a predetermined period of time and no requests are pending, reducing a clock speed associated with at least one of the following: (a) an embedded chits memory, (b) an internal bus, and (c) an external memory.

19. The method of claim 18, wherein the input/output processor is an embedded processor.

20. The method of claim 19, filer comprising a plurality of embedded context managers, wherein a clock speed associated with each individual embedded context manger is capable of being independently reduced when a context manager has no outstanding input/output requests.

21. The I/O controller of claim 3, wherein if said number of outstanding input/output requests being processed by ad controller is less than a threshold, reducing the clock speed on said I/O processor.

* * * * *